H. H. LEWIS.
AUDIBLE SPEED INDICATOR FOR ROTATING MECHANISM.
APPLICATION FILED JUNE 18, 1914.
1,170,451. Patented Feb. 1, 1916.
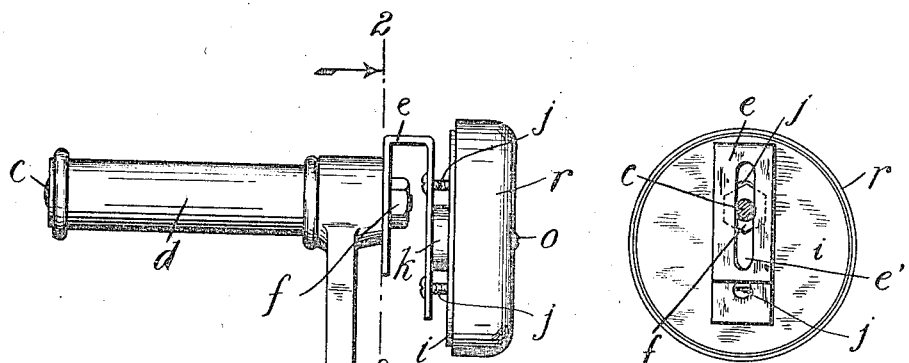
Fig. 1.
Fig. 2.
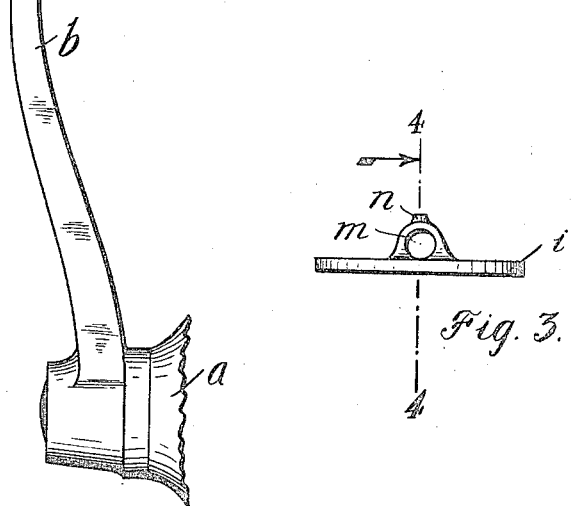
Fig. 3.
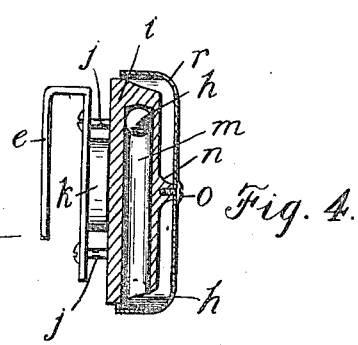
Fig. 4.
WITNESSES:
Wm. C. Schmitt
Cecil Long
INVENTOR
Harry H. Lewis.
BY
T. J. Geisler
ATTORNEY

UNITED STATES PATENT OFFICE.

HARRY H. LEWIS, OF PORTLAND, OREGON.

AUDIBLE SPEED-INDICATOR FOR ROTATING MECHANISM.

1,170,451.  Specification of Letters Patent.  Patented Feb. 1, 1916.

Application filed June 18, 1914. Serial No. 845,986.

*To all whom it may concern:*

Be it known that I, HARRY H. LEWIS, a citizen of the United States, and a resident of the city of Portland, county of Multnomah, State of Oregon, have invented a certain new and useful Improvement in Audible Speed-Indicators for Rotating Mechanism, of which the following is a specification.

My invention relates generally to mechanism having a rotating part, the circumferential speed of which is required to be maintained between a predetermined minimum and maximum in order that the mechanism will operate with efficiency.

My invention relates specifically to cream separators, and in this connection especially to hand-operated cream separators; so, in the further description of my invention its use will be specifically applied to hand-operated cream separators.

Preceding my present invention, I invented an audible underspeed indicator, which embodied the primary idea involved and for which I filed an application for Letters Patent February 5, 1915, under Serial No. 6,386.

In order to more readily understand my present invention it is convenient to briefly refer to the theory involved in the mechanical separation of cream from milk. All cream separators must be run at a predetermined speed in order to obtain the best results. If the cream separator be operated at under speed, the butter fats are not properly separated, and will be lost in the skim milk. On the other hand, if the separator is operated at too great a speed, the cream will get so thick that it will not flow properly in the machine and the milk will not produce its proper per cent. of cream. Audible means are preferable for indicating the proper speeds because practice has demonstrated that it is more convenient to depend upon the ear than the eye.

To attain my primary purpose, I heretofore combined with the crank-handle of a hand-operated separator, means consisting of a bell and striker arranged to be actuated by gravity and centrifugal force, and adapted to sound an alarm during each revolution of the crank handle, while rotating at underspeed and to cease giving an alarm when the proper speed is attained. Such device was not as practical as it should be, for the operator, in order to assure himself that he was not overspeeding, had to so turn the crank handle as to occasionally hear the sound indicating underspeed, so as to keep just above that point.

My present invention, however, has for its purpose the providing of improved means emitting two readily distinguishable sounds which will indicate not only when the cream-separator is being run under speed but also when run over speed. In other words, in my improved device, the underspeed is indicated by a ring and the approximate proper speed by a click, and silence of the latter indicates over speed.

The details of construction and operation of my device are hereinafter fully set forth.

In the accompanying drawings: Figure 1 is a side elevation of the operating handle and hub of a cream separator, in connection with which my indicating device is used. Fig. 2 is a vertical section taken approximately on the line 2—2 of Fig. 1; Fig. 3 is an end-elevation of the gong-stand; and Fig. 4 is a sectional view of the gong-stand and the gong; this view is taken on the line 4—4 of Fig. 3.

The hub of the cream separator is represented by $a$, the operating crank-arm by $b$, and the handle by $d$, the latter being secured by a bolt $c$. A U shaped strap of metal or bracket $e$ is made with a longitudinal slot, $e'$, in one leg. The bolt, $c$, of the handle, $d$, is extended through the slot, $e'$, and the nut $f$ holds the strap $e$ in fixed relationship to said handle. The bracket must be adjusted to radial alinement with the separator-shaft, $a$.

The bell $r$ and guide element for the hammer, $h$, are then mounted on the bracket $e$ in the following manner: The guide element $i$ is screwed on the bracket $e$, by the screws $j$, the spacer $k$ being put in place as shown. Said guide element is conveniently made of a plate 1 (see Fig. 3) having an integral barrel, $m$, for the ball-hammer, $h$. The barrel has restraining means on a closure at its upper end to prevent the hammer from striking the bell at that end of the barrel. A lug, $n$, on the barrel, $m$, forms a bearing for the bell, $r$, which is mounted on the lug by a screw, $o$.

In mounting the bell on the handle, the barrel, $m$, must be radially alined from the axis of rotation with the closed end of the barrel located farthest from said axis. The ball-hammer, $h$, is free to move in the barrel, $m$, being prevented from falling out of the open end of said barrel by the rim of the bell.

When the separator is being rotated above the predetermined speed, the centrifugal rce developed will tend to hold the ball-hammer $h$ out against the closed end of the barrel, $m$, but as soon as the rotary speed of the separator drops below this predetermined speed, gravity will cause the ball-hammer to drop down and strike the rim of the bell, as shown in broken lines in Fig. 4, whenever the crank-arm $b$ reaches its highest point. The alarm so given will indicate to the operator that the speed should be increased.

As the circumferential speed varies directly as the radius, the radial adjustment of the bracket $e$ would change alarm relatively to the desired speed of rotation.

When the rotation of the crank arm $b$, is first started, then once during each complete revolution of the crank-arm, and while the latter is in its highest position, the open end of the guide element being therefore down, the loose hammer will roll by gravity out of the open end of the guide element, and strike the bell; and when the crank arm is in its lowest position, the closed end of the guide-element being therefore down, the loose hammer will roll against the closed end of the guide-element, and produce a sharp click. Such actions continue until the speed of rotation of the crank arm is increased beyond the predetermined minimum, when the developed centrifugal force will restrain the movement of the hammer from striking the bell. The silence of the bell indicates that the separator is being operated ab— the predetermined minimum speed. The click produced by the hammer striking the closed end of the barrel, however, still continues until the predetermined maximum speed is reached, whereupon the click will also be eliminated, due to the fact that the developed centrifugal force is holding the ball against the closed end of the barrel, such closed end serving as a stop and the operator will thus be informed that the predetermined maximum speed is being exceeded. In short, the operator will run the separator at such speed as not to hear the ring, but still hear the click.

I claim:

1. In a device including a rotating member, the combination with the latter of an audible speed-indicator comprising two sound emitters distinguishable one from the other, and a striker adapted to be actuated by gravity and centrifugal force, and operating to strike one of said sound emitters during each revolution of said rotating member while rotating under a predetermined maximum speed, and said striker being restrained by the developed centrifugal force when such maximum speed of said member is exceeded.

2. The combination with a device having a rotating member of an audible speed-indicator consisting of a striker adapted to be actuated by gravity and centrifugal force, means for restraining the movement of the latter to a path radial to the axis of rotation of said member, and a sound emitter located at each end of said path whereby the striker will be caused to strike both sound emitters during each revolution of the member, while rotated under a predetermined speed, to strike one sound emitter while said member is rotated under a predetermined maximum speed, and said indicator will become silent, when said maximum speed is exceeded.

3. As an attachment for mechanism having a member rotating in a vertical plane, a bracket adapted for being attached to the rotating member, a guide element on the bracket and provided with a stop at its outer end, a loose hammer restrained by such guide element to move radially to the axis of rotation of said rotating member; and a bell supported by the bracket in position to be struck by the hammer, said stop also emitting a sound when struck.

4. As an attachment for mechanism having a member rotating in a vertical plane, a bracket adapted for being attached to the rotating member, a barrel on the bracket having a stop at one end, a loose ball hammer in such barrel and restrained thereby to move radially to the axis of rotation of said rotating member; and a bell supported by the bracket in position to be struck by the hammer, said stop also emitting a sound when struck.

HARRY H. LEWIS.

Witnesses:
WM. C. SCHMITT,
D. E. CRABB.